United States Patent
Rekaya et al.

(10) Patent No.: US 11,996,915 B2
(45) Date of Patent: May 28, 2024

(54) DEVICES AND METHODS FOR MACHINE LEARNING ASSISTED PRECODING

(71) Applicant: INSTITUT MINES-TELECOM, Palaiseau (FR)

(72) Inventors: Ghaya Rekaya, Antony (FR); Aymen Askri, Palaiseau (FR)

(73) Assignee: Institut Mines Telecom, Palaiseau (FR)

( * ) Notice: Subject to any disclaimer, the term of this patent is extended or adjusted under 35 U.S.C. 154(b) by 208 days.

(21) Appl. No.: 17/620,716

(22) PCT Filed: Jun. 23, 2020

(86) PCT No.: PCT/EP2020/067407
§ 371 (c)(1),
(2) Date: Dec. 19, 2021

(87) PCT Pub. No.: WO2021/001202
PCT Pub. Date: Jan. 7, 2021

(65) Prior Publication Data
US 2022/0247460 A1 Aug. 4, 2022

(30) Foreign Application Priority Data
Jul. 1, 2019 (EP) ..................................... 19305887

(51) Int. Cl.
*H04B 7/0456* (2017.01)
*G06N 20/00* (2019.01)

(52) U.S. Cl.
CPC ........... *H04B 7/0456* (2013.01); *G06N 20/00* (2019.01)

(58) Field of Classification Search
CPC .... H04B 7/0452; H04B 7/0456; G06N 3/048; G06N 3/084; G06N 5/01; G06N 20/00;
(Continued)

(56) References Cited

U.S. PATENT DOCUMENTS

2009/0175375 A1* 7/2009 Zhang ............... H04L 25/03343
375/267
2009/0238304 A1* 9/2009 Vetter ....................... H04L 1/06
375/295
(Continued)

FOREIGN PATENT DOCUMENTS

WO 2016/083772 A1 6/2016

OTHER PUBLICATIONS

Mohammadkarimi, et al., "Deep Learning-Based Sphere Decoding", IEEE Transactions on Wireless Communications, vol. 18, Issue: 9, Sep. 2019.
(Continued)

*Primary Examiner* — David B Lugo
(74) *Attorney, Agent, or Firm* — BakerHostetler

(57) ABSTRACT

A precoder for precoding a vector of information symbols is provided. The precoder includes a radius determination unit configured to determine a search sphere radius, the determination of the search sphere radius comprising applying a machine learning algorithm to input data dependent on the vector of information symbols and on a predefined precoding matrix; a sphere encoding unit configured to determine a perturbation vector from lattice points found inside a spherical region by applying a sphere search-based sequential algorithm, the spherical region having as a radius the search sphere radius, and a precoding unit configured to precode the vector of information symbols using the perturbation vector and a precoding matrix.

15 Claims, 5 Drawing Sheets

(58) Field of Classification Search
CPC ............... G06N 20/10; H04L 25/0254; H04L 25/03165; H04L 25/03178; H04L 25/03286
See application file for complete search history.

(56) References Cited

U.S. PATENT DOCUMENTS

| | | | |
|---|---|---|---|
| 2009/0257530 A1* | 10/2009 | Shim | H04L 25/03197 375/340 |
| 2018/0176049 A1* | 6/2018 | Nikitopoulos | H04L 25/03242 |
| 2020/0051550 A1* | 2/2020 | Baker | G06N 3/084 |
| 2020/0410001 A1* | 12/2020 | Sarkissian | G06F 3/0482 |

OTHER PUBLICATIONS

Huang, et al., "Deep-Learning-Based Millimeter-Wave Massive MIMO for Hybrid Precoding", IEEE Transactions on Vehicular Technology, vol. 68, Issue: 3, Mar. 2019.

Hochwald, et al., "A vector-perturbation technique for near-capacity multiantenna multiuser communication—part II: perturbation", IEEE Transactions on Communications, vol. 53, Issue: 3, pp. 537-544, Mar. 2005.

Zhang, et al., "Near-capacity MIMO multiuser precoding with QRD-M algorithm", Signals, System and Computers, pp. 1498-1502, 2005.

Askri, et al., "DNN assisted Sphere Decoder", 2019 IEEE International Symposium on Information Theory (ISIT), pp. 1172-1176, 2019.

Lo, "Maximum ratio transmission", IEEE Transactions on Communications, vol. 47, Issue: 10, pp. 1458-1461, Oct. 1999.

Joham, et al., "Linear transmit processing in MIMO communications systems", IEEE Transactions on Signal Processing, vol. 53, No. 8, pp. 2700-2712, 2005.

Björnson, et al., "Optimal Resource Allocation in Coordinated Multi-Cell Systems", Foundations and Trends in Communications and Information Theory, vol. 9, No. 2-3, 2013.

Costa, "Writing on Dirty Paper", IEEE Transactions on Information Theory, vol. 29, Issue: 3, pp. 439-441. May 1983.

Tomlinson, "New automatic equalizer employing modulo arithmetic", Electronics Letters, vol. 7, No. 5, pp. 138-139, 1971.

Mohaisen, et al., "Fixed-complexity sphere encoder for multi-user MIMO systems", in Journal of Communications and Networks, vol. 13, No. 1, Feb. 2011.

El-Khamy, et al., "Reduced complexity list sphere decoding for MIMO systems", Digital Signal Processing, vol. 25, pp. 84-92, 2014.

Weingarten, et al., "The capacity region of the Gaussian multiple-input multiple-output broadcast channel", Archived Oct. 23, 2012 at the Wayback Machine, IEEE Transactions on Information Theory, vol. 52, No. 9, pp. 3936-3964, 2006.

\* cited by examiner

DEVICES AND METHODS FOR MACHINE LEARNING ASSISTED PRECODING

CROSS-REFERENCE TO RELATED APPLICATIONS

This application is a National Stage of International patent application PCT/EP2020/067407, filed on Jun. 23, 2020, which claims priority to foreign European patent application No. EP 19305887.2, filed on Jul. 1, 2019, the disclosures of which are incorporated by reference in their entirety.

TECHNICAL FIELD

The invention generally relates to digital communications and in particular to methods and devices for precoding data signals.

BACKGROUND

Multiple-input multiple-output (MIMO) technologies were developed to increase system capacity and offer better link reliability. MIMO systems exploit the space and time dimensions to encode and multiplex more data symbols using a multiplicity of transmit and/or receive antennas, over a plurality of time slots. As a result, the capacity, range, and reliability of MIMO-based communication systems can be enhanced. These key potential benefits of MIMO technologies make them ideal candidates in many wired, wireless and optical communication systems applied for example in local and wide area networks.

One major challenge for MIMO systems is to adapt to increasing demands in terms of data rates for real-time services and applications. Another challenge relates to the complexity and energy consumption of the signal processing at transceiver devices.

Precoding, also known as 'transmit beamforming', is a multiuser signal processing technique that exploits the spatial degrees of freedom offered by the multiple transmit antennas to simultaneously serve a plurality of users in a multi-antenna wireless communication system.

In MIMO point-to-point systems, precoding enables emitting multiple data streams from the transmit antennas with independent and appropriate weightings such that the link throughput is maximized at the receiver output.

In multiuser MIMO systems, also known as distributed MIMO systems, a multi-antenna transmitter communicates with multiple receivers according to space division multiple access (SDMA) techniques. Precoding enables separating user data streams and pre-cancelling interference based on channel knowledge at the transmitter such that one or more objective functions (e.g. throughput maximization, fairness maximization) is satisfied under one or more constraints (e.g. sum transmit power constraint, per antenna transmit power constraint). Different precoding techniques exist to solve different objective functions under different constraints.

Precoding techniques can be grouped into two categories: linear and non-linear. Linear precoding is realized when the signal processing procedures only involve linear operations and refers to linear transmit filters. Exemplary linear precoding techniques include:

maximum ratio transmission (MRT) disclosed in "T. Lo, Maximum ratio transmission, IEEE Transactions on Communications, vol. 47, no. 10, pp. 1458-1461, 1999";

Zero-Forcing (ZF) precoding disclosed in "M. Joham, W. Utschick, and J. Nossek, Linear transmit processing in MIMO communications systems, IEEE Transactions on Signal Processing, vol. 53, no. 8, pp. 2700-2712, 2005", Minimum Mean Square Error (MMSE) precoding disclosed in "E. Björnson and E. Jorswieck, Optimal Resource Allocation in Coordinated Multi-Cell Systems, Foundations and Trends in Communications and Information Theory, vol. 9, no. 2-3, pp. 113-381, 2013", and transmit Wiener precoding disclosed in "M. Joham, W. Utschick, and J. Nossek, Linear transmit processing in MIMO communications systems, IEEE Transactions on Signal Processing, vol. 53, no. 8, pp. 2700-2712, 2005".

Linear precoding techniques require reasonable computational complexity. However they provide suboptimal performance. For example MRT only maximizes the signal gain at intended users/receivers and is close-to-optimal only in noise-limited systems where the inter-user interference is negligible compared to the noise.

The ability of ZF precoding to fully cancel out multiuser interference makes it useful for high signal-to-noise ratio regimes at the expense of losing some signal gain. However, ZF precoding performs far from optimal in the noise limited regime. In addition, using ZF precoding, the transmitted vector is pre-filtered using the pseudo-inverse of the channel matrix, which requires a high transmission power particularly when the channel matrix is ill-conditioned.

Non-linear precoding is based on the concept of dirty paper coding disclosed in "H. Weingarten, Y. Steinberg, and S. Shamai, The capacity region of the Gaussian multiple-input multiple-output broadcast channel Archived 2012 Oct. 23 at the Wayback Machine, IEEE Transactions on Information Theory, vol. 52, no. 9, pp. 3936-3964, 2006". Dirty paper coding shows that any known interference at the transmitter can be subtracted without the penalty of radio resources if optimal precoding scheme can be applied on the transmit signal. In such coding schemes, only the transmitter needs to know the interference, while full channel state information is required at the transmitter and the receivers in order to achieve the weighted sum capacity. Exemplary non-linear precoding techniques include:

Costa precoding disclosed in "M. Costa, Writing on dirty paper, IEEE Transactions on Information Theory, vol. 29, no. 3, pp. 439-441, 1983";

Tomlinson-Harashima precoding (THP) disclosed in "M. Tomlinson, New automatic equalizer employing modulo arithmetic, Electronics Letters, vol. 7, no. 5, pp. 138-139, 1971", and Vector permutation technique disclosed in "B. M. Hochwald, C. B. Peel, and A. L. Swindlehurst, A vector-perturbation technique for near-capacity multiantenna multi-user communication—Part II: Perturbation, IEEE Transactions on Communications, vol. 53, no. 1, pp. 537-544, 2005".

THP achieves better performance than linear precoding strategies by limiting the transmit power via a non-linear modulo operation. Vector perturbation techniques enable to further reduce the transmit power by perturbing the transmitted vector, where the optimum perturbation vector is found using the Sphere Encoder disclosed in "B. Hochwald, C. Peel, and L. Swindlehurst, "A vector-perturbation technique for near-capacity multiantenna multiuser communication-Part II: Perturbation," IEEE Transactions on Communications, vol. 53, no. 3, pp. 537-544, March 2005".

Although the Sphere Encoder achieves full diversity order and good performance, it requires high computational complexity that increases exponentially as the number of the antennas increases.

In order to overcome the random complexity of the Sphere Encoder, Sphere Encoder implementations have been developed. An exemplary implementation referred to as the M-algorithm encoder has been proposed in "J. Z. Zhang and K. J. Kim, "Near-capacity MIMO multiuser precoding with QRD-M algorithm," in Proceedings of IEEE ACSSC, pages 1498-1502, November 2005". The M-algorithm encoder is based on the reduction of the number of candidates at each encoding tree level to M candidates. The M-algorithm encoder achieves the same performance as the Sphere Encoder, however it still requires a high complexity.

Another exemplary implementation was proposed in "M. Mohaisen and K. Chang, Fixed-complexity sphere encoder for multi-user MIMO systems, in Journal of Communications and Networks, vol. 13, no. 1, pp. 63-69, February 2011". This implementation is based on a fixed-complexity sphere decoder that achieves optimal diversity order of the M-algorithm. However, it presents bit error rate performance degradation.

There is accordingly a need for developing optimal performance and low-complexity precoding devices and methods for multi-antenna systems.

SUMMARY

In order to address these and other problems, there is provided a precoder for precoding a vector of information symbols, the precoder comprising:
- a radius determination unit configured to determine a search sphere radius, the determination of the search sphere radius comprising applying a machine learning algorithm to input data dependent on the vector of information symbols and on a predefined precoding matrix;
- a sphere encoding unit configured to determine a perturbation vector from lattice points found inside a spherical region by applying a sphere search-based sequential algorithm, the spherical region having as a radius the search sphere radius, and
- a precoding unit configured to precode the vector of information symbols using the perturbation vector and a precoding matrix.

According to some embodiments, the radius determination unit may be configured to apply one or more iterations of a radius update function to update a current radius until a termination condition is fulfilled, the current radius being initially set to a preliminary radius, each iteration of the radius update function comprising:
- applying the machine learning algorithm to input data derived from the vector of information symbols, from the predefined precoding matrix and from the current radius, which provides a current predicted number of lattice points associated with a current radius;
- comparing the current predicted number of lattice points to a given threshold;
- updating the current radius if the current predicted number of lattice points is strictly higher than the given threshold, the current radius being updated by applying a linear function to the current radius;

the termination condition being related to the current predicted number of lattice points, the radius determination unit being configured to set the search sphere radius to the current radius, in response to the fulfillment of the termination condition.

According to some embodiments, the termination condition may be satisfied if the current predicted number of lattice points is smaller than or equal to the given threshold.

According to some embodiments, the linear function may have a slope parameter equal to ½ and an intercept parameter equal to zero.

According to some embodiments, the machine learning algorithm may be a supervised machine learning algorithm chosen in a group comprising Support Vector Machines, linear regression, logistic regression, naive Bayes, linear discriminant analysis, decision trees, k-nearest neighbor algorithm, neural networks, and similarity learning.

According to some embodiments, the supervised machine learning algorithm may be a multilayer deep neural network comprising an input layer, one or more hidden layers, and an output layer, each layer comprising a plurality of computation nodes, the multilayer deep neural network being associated with model parameters and an activation function, the activation function being implemented in at least one computation node among the plurality of computation nodes of the one or more hidden layers.

According to some embodiments, the activation function may be chosen in a group comprising a linear activation function, a sigmoid function, a Relu function, the Tanh, the softmax function, and the CUBE function.

According to some embodiments, the radius determination unit may be configured to previously determine the model parameters during a training phase from received training data, the radius determination unit being configured to determine a plurality of sets of training data from the training data and from a set of expected numbers of lattice points, each expected number of lattice points being associated with a set of training data among the plurality of sets of training data, the training phase comprising two or more iterations of the following steps:
- processing the deep neural network using a set of training data among the plurality of training data as input, which provides an intermediate number of lattice points associated with the set of training data;
- determining a loss function from the expected number of lattice points and the intermediate number of lattice points associated with the set of training data, and
- determining updated model parameters by applying an optimization algorithm according to the minimization of the loss function.

According to some embodiments, the optimization algorithm may be chosen in a group comprising the Adadelta optimization algorithm, the Adagrad optimization algorithm, the adaptive moment estimation algorithm, the Nesterov accelerated gradient algorithm, the Nesterov-accelerated adaptive moment estimation algorithm, the RMSprop algorithm, stochastic gradient optimization algorithms, and adaptive learning rate optimization algorithms.

According to some embodiments, the loss function may be chosen in a group comprising a mean square error function and an exponential log likelihood function.

According to some embodiments, the radius determination unit may be configured to previously apply a list sphere decoding algorithm or a list spherical-bound stack decoding algorithm to determine the expected numbers of lattice points from the search sphere radius and from the channel matrix.

According to some embodiments, the radius determination unit may be configured to determine the number of iterations of the radius update function as a function of the preliminary radius, the given threshold, and a determinant of the predefined precoding matrix.

According to some embodiments, the sphere search-based sequential algorithm may be chosen among a group comprising the sphere decoder and the spherical-bound sphere decoder.

There is also provided a transmitter implementing a precoder according to any preceding features, the transmitter being equipped with multiple antennas and being configured to transmit the vector of information symbols to a plurality of receivers in a multiuser multiple-input multiple-output system.

There is also provided a method for precoding a vector of information symbols, the method comprises:
- determining a search sphere radius, the determination of the search sphere radius comprising applying a machine learning algorithm to input data dependent on the vector of information symbols and on a predefined precoding matrix;
- determining a perturbation vector from lattice points found inside a spherical region by applying a sphere search-based sequential algorithm, the spherical region having as a radius the search sphere radius, and
- precoding the vector of information symbols using the perturbation vector and a precoding matrix.

Advantageously, the embodiments of the invention provide efficient sphere radius design and controlling techniques that allow reducing the complexity of sphere encoder-based vector perturbation precoding techniques without compromising the precoding error performance.

Advantageously, the embodiments of the invention provide efficient non-linear precoding techniques that require reduced computational complexity and reduced processing time.

Further advantages of the present invention will become clear to the skilled person upon examination of the drawings and the detailed description.

BRIEF DESCRIPTION OF THE DRAWINGS

The accompanying drawings, which are incorporated in and constitute a part of this specification, illustrate various embodiments of the invention.

DETAILED DESCRIPTION

Figure 1:
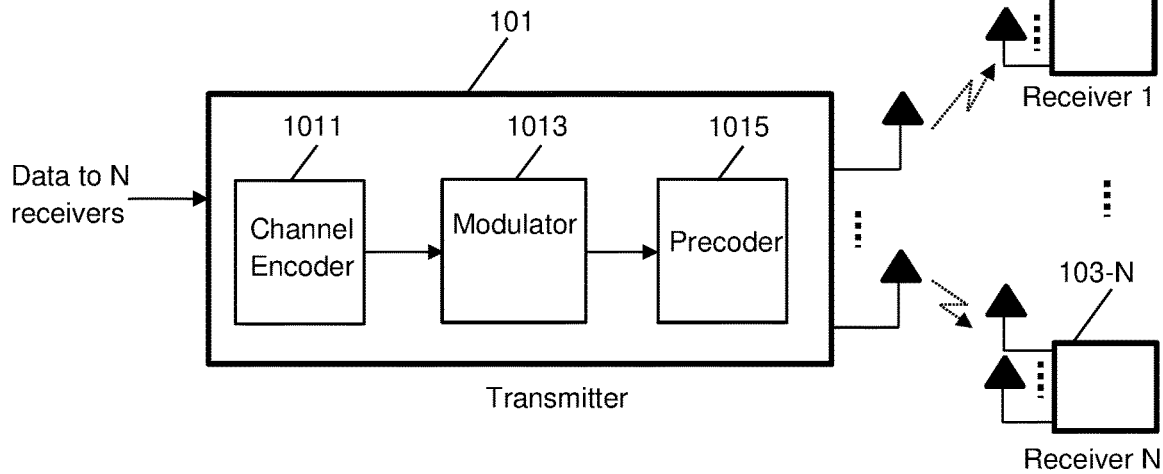
FIG. 1 is a schematic diagram of an exemplary application of the invention in multi-antenna communication systems.

Embodiments of the invention provide devices, methods, and computer programs for precoding a vector of information symbols sent from a multi-antenna transmitter to a plurality of receivers through a transmission channel in a communication system with a reduced computational complexity. In particular, embodiments of the present invention provide methods, devices and computer program products for low-complexity and optimal performance vector permutation precoding based on Sphere Encoder that implements efficient sphere radius design techniques. Sphere radius design techniques according to the embodiments of the invention enable determining optimal precoding vector for the Sphere Encoder with a reduced complexity and reduced processing time. The design and control of the search sphere radius according to the embodiments of the invention relies on machine learning techniques.

To facilitate the understanding of embodiments of the invention, there follows some definitions and notations used hereinafter:

$\Lambda$ refers to an n-dimensional lattice constructed over the Euclidean space $\mathbb{R}^n$ and represents an additive discrete subgroup of the Euclidean space $\mathbb{R}^n$. The lattice $\Lambda$ is spanned by the n linearly independent vectors $v_1, \ldots, v_n$ of $\mathbb{R}^n$ and is given by the set of integer linear combinations according to:

$$\Lambda = \left\{ u = \sum_{i=1}^{n} a_i v_i, a_i \in \mathbb{Z}, v_i \in \mathbb{R}^n \right\} \quad (1)$$

A lattice generator matrix $P | \mathbb{R}^{n \times n}$, refers to a real-value matrix that comprises real-value components $W_{ij} \in \mathbb{R}$. A lattice point u that belongs to the lattice $\Lambda$ is a n-dimensional vector, $u \in \mathbb{R}^n$, that can be written as function of the lattice generator matrix W according to:

$$u = Ps, s \in \mathbb{Z}^n \quad (2)$$

$m(.) = \|.\|_2$ defines the Euclidean metric (also referred to as 'the Euclidean distance') as the distance between two points in the Euclidean Space.

$r_0$ designates a preliminary sphere radius (also referred to as 'preliminary radius').

$r_s$ designates a search sphere radius used in the sphere encoder algorithm.

$D(K, \theta_{k=1, \ldots, K}, \sigma)$ refers to a multilayer deep neural network made up of an input layer and $K \geq 2$ layers comprising one or more hidden layers and an output layer, and artificial neurons (hereinafter referred to as 'nodes' or 'computation nodes') connected to each other. The number of layers K represents the depth of the deep neural network and the number of nodes in each layer represents the width of the deep neural network. $N^{(k)}$ designates the width of the $k^{th}$ layer and corresponds to the number of computation nodes in the $k^{th}$ layer.

The multilayer deep neural network is associated with model parameters denoted $\theta_{k=1, \ldots, K}$ and an activation function denoted $\sigma$. The activation function $\sigma$ refers to a computational non-linear function that defines the output of a neuron in the hidden layers of the multilayer deep neural network. The model parameters $\theta_{k=1, \ldots, K}$ comprise sets of parameters $\theta_k$ for $k=1, \ldots, K$, the $k^{th}$ set $\theta_k = \{W^{(k)} \in \mathbb{R}^{N^{(k)} \times N^{(k-1)}}; b^{(k)} \in \mathbb{R}^{N^{(k)}}\}$ designating a set of layer parameters associated with the $k^{th}$ layer (corresponding to a hidden layer or to the output layer) of the multilayer deep neural network comprising:

a first layer parameter, denoted by $W^{(k)} \in \mathbb{R}^{N^{(k)} \times N^{(k-1)}}$, designating a weight matrix comprising real-value coefficients, each coefficient representing a weight value associated with a connection between a node that belongs to the $k^{th}$ layer and a node that belongs to the $(k-1)^{th}$ layer;

a second layer parameter, denoted by $b^{(k)} \in \mathbb{R}^{N^{(k)}}$, designating a vector of bias values associated with the $k^{th}$ layer;

L designates a loss function and refers to a mathematical function used to estimate the loss (also referred to as 'the error' or 'cost') between estimated (also referred to as 'intermediate') and expected values during a training process of the deep neural network.

An optimizer (hereinafter referred to as 'an optimization algorithm' or 'a gradient descent optimization algorithm') refers to an optimization algorithm used to update parameters of the deep neural network during a training phase.

Epochs refer to the number of times the training data have passed through the deep neural network in the training phase.

A mini-batch refers to a sub-set of training data extracted from the training data and used in an iteration of the training phase. The mini-batch size refers to the number of training data samples in each partitioned mini-batch.

The learning rate (also referred to as 'a step size') of a gradient descent algorithm refers to a scalar value that is multiplied by the magnitude of the gradient.

The embodiments of the invention provide devices, methods and computer program products for precoding a vector of information symbol in multi-antenna systems with a reduced complexity and optimal precoding performance.

The embodiments of the invention may be implemented in multi-antenna systems to precode a vector of information symbols conveyed from a multi-antenna transmitter to a plurality of receivers, each receiver being equipped with one or more antennas. Such multi-antenna communication systems are known as multiuser MIMO systems or distributed MIMO systems.

Multiuser MIMO systems are used for data transmission in various applications comprising, without limitation, radio communications (e.g. LTE, LTE-advanced, and 5G), Internet of Thing communications (e.g. vehicle-to-everything communications), local area network communications (e.g. wireless ad-hoc communications), massive MIMO supported for example in next 5G radio communications.

FIG. 1 is a block diagram of an exemplary application of the invention to a wireless communication system 100, according to some embodiments. The communication system 100 may comprise a transmitter device 101 (hereinafter referred to as a "transmitter") configured to transmit data to a plurality of N receiver devices 103-1 to 103-N (hereinafter referred to as "receivers") through a transmission channel. The transmitter 101 may implement a precoder 1015 to precode a vector of information symbols sent to the one or more receivers 103-1 to 103-N. Data transmission in the communication system 100 may correspond to a downlink communication scenario during which the transmitter 101 is configured to serve a plurality of receivers 103-1 to 103-N simultaneously. The transmitter 101 may be any device configured to operate in a wireless environment to serve a plurality of users. For example, transmitter 101 may be a base station, a relay station, an eNode B in a cellular network, an access point in a local area network or ad-hoc networks or any other interfacing device operating in a wireless environment. The transmitter 101 may be fixed or mobile. The receivers may be any fixed or mobile device configured to operate in a wireless network and to decode the conveyed symbols by the transmitter 101. Exemplary receiver devices comprise without limitations mobile phones, computers, laptops, tablets, drones, and IoT devices.

The transmitter 101 may be equipped with two or more transmit antennas M and each of the receivers 103-1 to 103-N may be equipped with one or more receive antennas, the number M of transmit antennas being higher than or equal to the number N of receivers.

According to some embodiments, the communication system 100 may use, alone or in combination, any multiple access technique such as Time Division Multiple Access (TDMA), Frequency Division Multiple Access (FDMA), Code Division Multiple Access (CDMA), and Space-Division Multiple Access (SDMA).

The transmission channel may be any linear Additive White Gaussian Noise (AWGN) channel or a multipath channel using single-carrier or multi-carrier modulation formats such as OFDM (Orthogonal Frequency Division Multiplexing) and FBMC (Filter Bank Multi-Carrier) for mitigating frequency-selectivity, interference and delays.

For illustration purposes only, the following description will be made with reference to a wireless multi-user MIMO system accommodating a transmitter 101 equipped with $M \geq 2$ transmit antennas and $N \leq M$ receivers 103-1 to 103-N, each receiver being equipped with a single antenna for decoding the intended information symbol sent by the transmitter 101. However, the skilled person will readily understand that embodiments of the invention apply to multi-user MIMO systems involving multiple antenna receivers.

Accordingly, the transmitter 101 may receive a data vector that comprises data destined to each of the plurality of receivers 103-1 to 103-N over a noisy wireless multiuser channel represented by a channel matrix.

The embodiments of the invention provide efficient devices and methods for precoding data in multiuser MIMO systems. Accordingly, the transmitter 101 may comprise:
a channel encoder 1011 implementing one or more Forward Error Correction (FEC) codes such as linear block codes, convolutional codes, polar codes, Low-Density Parity-Check (LDPC) codes etc;
a modulator 1013 implementing a modulation scheme such as Quadrature Amplitude Modulation (QAM) to deliver a modulated vector of information symbol, and
a precoder 1015 configured to determine a precoded vector of information symbols to be sent over the transmission channel to the plurality of receivers 103-1 to 103-N.

The transmitter 101 may be configured to encode the received data that is a flow of information bits using a FEC encoder 1011 implementing for example a linear block code, a convolutional code, a LDPC code, or a polar code. The encoded binary signal may be then modulated into a symbol vector $s_c$ using the modulator 1013. Different modulation schemes may be implemented such as $2^q$-QAM or $2^q$-PSK with $2^q$ symbols or states. The modulated vector $s_c$ may be a complex-value vector comprising $\kappa$ complex-value symbols $s_1, s_2, \ldots, s_\kappa$ with q bits per symbol.

An information symbol $s_j$ has a mean power $E_s$, and can be written in the form:

$$s_j = R(s_j) + iI(s_j) \qquad (3)$$

In equation (3), i denotes the complex number such that $i^2 = -1$ and the $R(.)$ and $I(.)$ operators output respectively the real and imaginary parts of an input value.

When modulation formats such as $2^q$-QAM are used, the $2^q$ symbols or states represent a sub-set of the integer field $Z[i]$. The corresponding constellation is composed of $2^q$ points representing the different states or symbols. In addition, in the case of squared modulations, the real and imaginary parts of the information symbols belong to the same finite alphabet $A = [-(q-1), (q-1)]$. The minimum distance $d_{min}$ of a modulation scheme represents the Euclidean distance between two adjacent points in the constellation and is equal to 2 in such example.

According to some embodiments illustrated in FIG. 1, the transmitter 101 may use V-BLAST spatial multiplexing to multiplex the precoded information symbols over the different transmit antennas, without performing a coding in the time dimension.

In other embodiments (not illustrated in FIG. 1), the transmitter 101 may implement Space-Time coding to encode the precoded information symbols into a codeword that is sent over the different antennas during a plurality of time slots that correspond to the time dimension of the used Space-Time coding scheme.

The precoded vector of information symbols may be converted from the time domain to the frequency domain using a multicarrier modulation technique, using for example OFDM or FBMC modulators, and spread over the transmit antennas. Signals may be sent from the transmit antennas after optional filtering, frequency transposition and amplification.

The embodiments of the invention rely on the use of vector perturbation precoding techniques at the transmitter. Accordingly, the precoder 1015 may be configured to perform complex-to-real conversion of the N complex-value symbols vector $s_c$ to obtain a real-value vector of information symbols denoted by $s \in \mathbb{R}^n$ with $n=2N$, the real-value vector of information symbols comprising the real and imaginary parts of the original complex-value information symbols comprised in the vector $s_c$. In embodiments where for example a $2^q$-QAM modulation is used, the components of the vector $s = (s_1, s_2, \ldots, s_n)^t$ belong to the same finite alphabet $A = [-(q-1), (q-1)]$.

Using vector perturbation precoding, the precoder 1015 may be configured to precode the vector of information symbols $s$ into a precoded vector of information symbols denoted $s_p$ using a scaled permutation vector denoted $\tau t$ and a predefined precoding matrix denoted P, with $\tau$ being an integer scaling factor that depends on the modulation scheme and $t = (t_1, t_2, \ldots, t_n)^t$ being an integer-value perturbation vector that comprises n integer values. The perturbed vector can be written as $\tilde{s} = s + \tau t$ and the precoded vector of information symbols may be expressed as:

$$s_p = P(s + \tau t) \quad (4)$$

According to some embodiments, the scaling factor may be given by:

$$\tau = 2\left(c_{max} + \frac{d_{min}}{2}\right) \quad (5)$$

In equation (5), $c_{max}$ designates the absolute value of the constellation point with the largest magnitude.

According to some embodiments, the precoder 1015 may be configured to perform vector perturbation of the vector of information symbols so that the transmit power is reduced. Accordingly, the precoder 1015 may be configured to determine the optimal vector perturbation t according to the minimization of the transmit power of the precoded vector of information symbols such that:)

$$t = \underset{t \in \mathbb{Z}^n}{\operatorname{argmin}} \|s_p\|^2 = \underset{t \in \mathbb{Z}^n}{\operatorname{argmin}} \|P(s + \tau t')\|^2 = \underset{t \in \mathbb{Z}^n}{\operatorname{argmin}} \|Ps + P\tau t'\|^2 \quad (6)$$

The precoder 1015 may be configured to perform QR decomposition of the predefined precoding matrix according to $P=QR$ with $Q \in \mathbb{R}^{n \times n}$ being an orthogonal matrix and $R \in \mathbb{R}^{n \times n}$ being an upper triangular matrix. The upper triangular matrix is referred to as a predefined precoding matrix. The components of the upper triangular matrix are denoted by $R_{ij}$ with $i,j=1, \ldots, n$. Given the upper triangular form of the matrix R, the optimization problem for finding the optimal perturbation vector may be equivalently expressed by:

$$t = \underset{t \in \mathbb{Z}^n}{\operatorname{argmin}} \|R(s + \tau t)'\|^2 \quad (7)$$

The optimization problem in equation (7) to find the optimal perturbation vector is accordingly represented as an integer-lattice search that solves for the integer valued perturbation vector that minimizes the Euclidean metric given by:

$$m(t) = \|Ps + P\tau t\|^2 = \quad (8)$$
$$\|R(s + \tau t)\|^2 = \sum_{i=1}^{n} \left\| R_{ii}(s_i + \tau t_i) + \sum_{j=i+1}^{n} R_{ij}(s_j + \tau t_j) \right\|^2$$

A tree representation may be associated with the optimization problem, the tree representation being a graph data structure comprising a plurality of nodes, levels, branches and paths. More specifically, the tree comprises n levels where each level comprises a plurality of nodes.

Nodes in the tree correspond to the different possible values of the components $s_j + \tau t_j$.

Levels correspond to the ranks of the information symbols in the vector $s$ in a reverse order such that nodes located in the first level of the tree correspond to the last component of the vector of symbols $s$, the second level to the penultimate, and so on. By writing the vector $s=(s_1, s_2, \ldots, s_n)^t$, a node located at a level k in the tree corresponds to a possible value of the component $s_{n-k+1} + \tau t_{n-k+1}$. Nodes located in the last level of the tree are termed leaf nodes and correspond to the possible values of the first component $s_1 + \tau t_1$.

Branches depart from a virtual node termed 'root node' and link nodes located in two consecutive levels. A branch denoted as $(s_{i+1} + \tau t_{i+1}, s_i + \tau t_i)$ corresponds to a connection between two nodes $s_{i+1} + \tau t_{i+1}$ and $s_i + \tau t_i$ located in the consecutive levels n−i and n−i+1.

Each branch is associated with a cost function (also referred to hereinafter as 'partial metric' or 'partial Euclidean Distance'). The cost function associated to a branch $(s_{i+1} + \tau t_{i+1}, s_i + \tau t_i)$ may be defined by:

$$m(s_{i+1} + \tau t_{i+1}, s_i + \tau t_i) = \left\| R_{ii}(s_i + \tau t_i) + \sum_{j=i+1}^{n} R_{ij}(s_j + \tau t_j) \right\|^2 \quad (9)$$

Each node in the tree may be associated with a metric. Using the definition of the partial metrics of branches, a metric associated with a given node in the tree may be seen as a summation of the partial metrics of the different branches constituting the path from the root node to this given node. Accordingly, a metric associated with a node $s_k + \tau t_k$ located at the level k may be expressed as:

$$m_k(s_k + \tau t_k) = \sum_{i=n}^{n-k+1} m(s_{i+1} + \tau t_{i+1}, s_i + \tau t_i) = \sum_{i=n}^{n-k+1} \left\| R_{ii}(s_i + \tau t_i) + \sum_{j=i+1}^{n} R_{ij}(s_j + \tau t_j) \right\|^2 \quad (10)$$

A path from the root node to a leaf node corresponds to a possible value of the vector $s + \tau t$.

According to the tree representation, the optimization problem may be equivalently solved by performing a tree-search using a sequential algorithm. The solution of the optimization problem corresponds to the path in the tree resulting in the lowest metric.

The computational complexity of the tree-search is proportional to the number of visited nodes during the tree-search which depends on the number of nodes at each level and the total number of levels of the decoding tree.

In order to reduce the number of examined nodes and hence reduce the precoding complexity, the embodiments of the invention provide precoding methods and devices based on sphere search-based sequential algorithms that reduce the number of visited nodes during the tree search by imposing search intervals for each level of the tree. Only nodes that belong to these search intervals are examined while exploring the path with the lowest metric.

More specifically, according to the embodiments of the invention, the precoder 1015 implements the Sphere Encoder (SE) approach to determine the optimal perturbation vector used for data precoding. The Sphere Encoder relies on searching the optimal perturbation vector inside a spherical region $\mathcal{S}_{r_s}$ centered at the origin and having as a radius a search sphere radius $r_s$. Accordingly, the optimization problem for finding the optimal perturbation vector can be equivalently expressed as:

$$t = \underset{t' \in \mathbb{Z}^n}{\operatorname{argmin}} \|R(s + \tau t')\|^2 \leq r_s^2 \quad (11)$$

Departing from the search sphere radius $r_s$, sphere search-based sequential algorithms search for a first lattice point associated with one of the possible values of the vector $s + \tau t$ inside the spherical region $S_{r_s}$. Upon finding a lattice point, the value of the search sphere radius is updated to the value of the cumulated metric associated with the lattice point found in the spherical region $S_{r_s}$ corresponding to the vector $s + \tau t$. This sphere-constrained search and the radius update are performed iteratively until finding the path in the tree which corresponds to the smallest cumulated metric.

The complexity of the lattice points search phase depends critically on the choice of the search sphere radius $r_s$. The embodiments of the invention provide efficient devices and methods for determining search sphere radius $r_s$ that enables reducing the complexity of the tree-search phase without sacrificing optimal performance.

Figure 2:
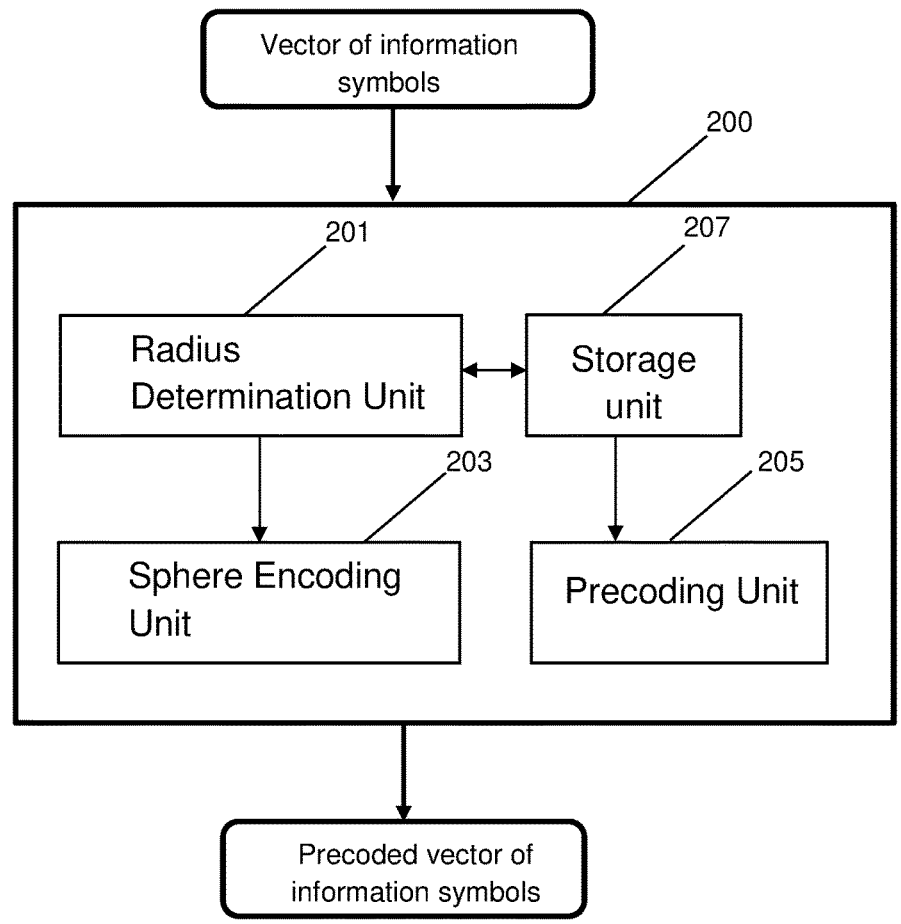
FIG. 2 is a block diagram illustrating a precoder, according to some embodiments of the invention in which sphere encoding is considered.

FIG. 2 is a block diagram illustrating the structure of a precoder 200 according to some embodiments of the invention in which machine learning techniques are used to efficiently design the search sphere radius considered to seek for the optimal perturbation vector. Accordingly, the precoder 200 may comprise a radius determination unit 201 configured to determine a search sphere radius $r_s$, the determination of the search sphere radius comprising applying a machine learning algorithm to input data that depend on the predefined precoding matrix R, the integer scaling factor $\tau$, and the vector of information symbols $s = (s_1, s_2, \ldots, s_n)^t$.

The precoder 200 may further comprise a sphere encoding unit 203 configured to determine the perturbation vector t solution of the optimization problem $$t = \underset{t' \in \mathbb{Z}^n}{\operatorname{argmin}} \|R(s + \tau t')\|^2 \leq r_s^2$$

from lattice points found inside the spherical region $\mathcal{S}_{r_s}$ centered at the origin and having as a radius the search sphere radius $r_s$ determined by the sphere radius determination unit 201.

The precoder 205 may further comprise a precoding unit 205 configured to precode the vector of information symbols using the perturbation vector $$t = \underset{t' \in \mathbb{Z}^n}{\operatorname{argmin}} \|R(s + \tau t')\|^2 \leq r_s^2,$$

the integer scaling factor $\tau$, and the precoding matrix P such that the precoded vector of information symbols is given by $s_p = P(s + \tau t)$.

According to some embodiments, the radius determination unit 201 may be configured to determine the search sphere radius $r_s$ according to an iterative process by applying one or more iterations (a number of iterations $N_{iter} \geq 1$) of a radius update function to update a current radius until a stopping condition (also referred to as 'a termination condition') is fulfilled. The current radius corresponding to the $i^{th}$ iteration is designated by $r_s^{(i)}$, for $i = 1, \ldots, N_{iter}$. Accordingly, at a first iteration for $i = 1$, the radius determination unit 201 may be configured to initially set a current radius to a preliminary radius $r_0$ such that $r_s^{(1)} = r_0$. After the initialization of the current radius, the radius determination unit 201 may be configured to iteratively update the current radius during $N_{iter}$ iterations of the radius update function, each $i^{th}$ iteration of the radius update function for $i = 1, \ldots, N_{iter}$ comprising:

applying a machine learning algorithm to input data derived from the vector of information symbols s, the predefined precoding matrix R and the current radius $r_s^{(i)}$, which provides a current prediction $N_{pred}^{(i)}$ of number of lattice points (also referred to as 'a current predicted number of lattice points') associated with the current radius $r_s^{(i)}$;
 comparing the current prediction $N_{pred}^{(i)}$ of number of lattice points to a given threshold denoted by $N_{th}$;
 updating the current radius $r_s^{(i)}$ if the current prediction $N_{pred}^{(i)}$ of number of lattice points is strictly higher than the given threshold, i.e. if $N_{pred}^{(i)} > N_{th}$, the radius determination unit 201 being configured to update the current radius $r_s^{(i)}$ by applying a linear function $f(.)$ to the current radius. Accordingly, the index of the iteration is first updated such that i=i+1, then the current sphere radius is updated such that $r_s^{(i)} = f(r_s^{(i-1)})$.

The termination condition is satisfied if the current prediction $N_{pred}^{(i)}$ of number of lattice points is smaller than or equal to the given threshold $N_{th}$. Once the termination condition is satisfied, the radius determination unit 201 may be configured to set the search sphere radius $r_s$ to the last updated current radius $r_s^{(N_{iter})}$ that is associated with the current predicted number $N_{pred}^{(N_{iter})}$ of lattice points that satisfies the stopping condition such that $N_{pred}^{(N_{iter})} \leq N_{th}$. This means that the radius determination unit 201 sets the search sphere radius to the current radius in response to the fulfillment of the termination condition.

According to some embodiments, the linear function may have a slope parameter equal to ½ and an intercept parameter equal to zero, which corresponds to updating the current radius by dividing the current radius by two, i.e. $r_s^{(i)} = r_s^{(i-1)}/2$.

At each iteration i=1, ..., $N_{iter}$ of the radius update function, the radius determination unit 201 may be configured to process the machine learning algorithm to determine a predicted number of lattice points $N_{pred}^{(i)}$ that corresponds to a predicted number of lattice points that fall inside a spherical region centered at the origin and having of a sphere radius the current radius $r_s^{(i)}$. The machine learning algorithm takes as input, at each iteration i=1, ..., $N_{iter}$ of the radius update function, the input vector denoted $x_0^{(i)} = (s, r_s^{(i)}, R)$ that comprises n components of the vector of information symbols s, the current radius $r_s^{(i)}$, and $n^2$ components in the upper triangular R.

According to some embodiments, the radius determination unit 201 may be configured to determine the preliminary radius $r_0$ randomly.

According to some embodiments, the radius determination unit 201 may be configured to determine the number of iterations $N_{iter}$ of the radius update function by exploiting a counting function that relates the given threshold $N_{th}$ to the determinant of the upper triangular matrix R (which is the generator matrix of the lattice $\Lambda_R$), the counting function being given by:

$$N_{th} = \frac{vol(B_{r_{th}})}{\det(\Lambda_R)} = \frac{r_{th}^n \pi^{\frac{n}{2}} \Gamma\left(\frac{n}{2}+1\right)^{-1}}{\det(\Lambda_R)} = \frac{r_{th}^n V_n}{\det(\Lambda_R)} \quad (12)$$

$r_{th}$ designates the radius of the sphere that contains a number of lattice points equal to the threshold $N_{th}$, $\det(\Lambda_R)$ designates the determinant of the generator matrix of the lattice $\Lambda_R$, and $V_n$ designates the volume of a unit radius sphere in the real vector space $\mathbb{R}^n$.

Using the counting function and using a linear function having a slope parameter equal to ½ and an intercept parameter equal to zero, the inventors determined that by successively dividing the preliminary radius $r_0^2$ by two during $N_{iter}$ iterations, the number of iterations $N_{iter}$ may be expressed as function of the preliminary radius, the given threshold, and the determinant of the generator matrix of the lattice $\Lambda_R$ according to:

$$N_{iter} = \log_2(r_0^2) + \frac{2}{n}(\log_2(V_n) - E(\log_2(\det(\Lambda_R))) - E(\log_2(N_n))) \quad (13)$$

By exploiting the function relating the number of iterations to the preliminary radius, the radius determination unit 201 may be configured to set the search radius equal to $r_s^2 = r_0^2/2^{N_{iter}}$ without performing machine learning processing. This technique is referred to as 'smart sphere encoder' or SSE.

According to some embodiments, the sphere search-based sequential algorithm may be chosen in a group comprising the sphere decoder and the SB-Stack decoder.

According to some embodiments in which the Sphere Decoder is considered, the sphere encoding unit 203 may be configured to define search intervals denoted $I_i = [b_{inf,i}, b_{sup,i}]$ for each component $s_i + \tau t_i$, the lower boundary $b_{inf,i}$ and the upper boundary $b_{sup,i}$ of the search interval $I_i$ being determined from the search sphere radius $r_s$. The sphere constraint can be found recursively by scanning the points in the spherical region $\mathcal{B}_{r_s}$ of radius $r_s$ according to a branch and bound approach and selecting the lattice points that satisfy the shaping constraint expressed in the optimization problem. The sphere decoder is based on a depth-first tree search strategy. Each time a lattice point is found inside the sphere $\mathcal{B}_{r_s}$, the search sphere radius may be updated by setting the search sphere radius to a new value equal to the cumulated metric associated with the corresponding path. The last found lattice point having the cumulated metric may be selected to determine the vector $s+\tau t$.

According to some embodiments in which the SB-Stack is considered, a best-first tree-search may be used to explore the nodes in the tree. Starting from the root node, all or a sub-set of the child nodes are explored and a partial metric is computed for each explored child node. Only nodes that have a partial metric that satisfy the sphere constraint and the search intervals are generated and stored in a stack. The search is continued until finding a leaf node and the optimal path corresponding to the minimum cumulated metric, without any update of the search sphere radius.

According to some embodiments, the machine learning algorithm may be a supervised machine learning algorithm that maps input data to predicted data using a function that is determined based on labeled training data that consists of a set of labeled input-output pairs. Exemplary supervised machine learning algorithms comprise, without limitation, Support Vector Machines (SVM), linear regression, logistic regression, naive Bayes, linear discriminant analysis, decision trees, k-nearest neighbor algorithm, neural networks, and similarity learning.

In preferred embodiments, the supervised machine learning algorithm may be a multilayer perceptron that is a multilayer feed-forward artificial neural network made up of an input layer and at least two layers (K≥2) that comprise one or more hidden layers and an output layer.

Figure 3:
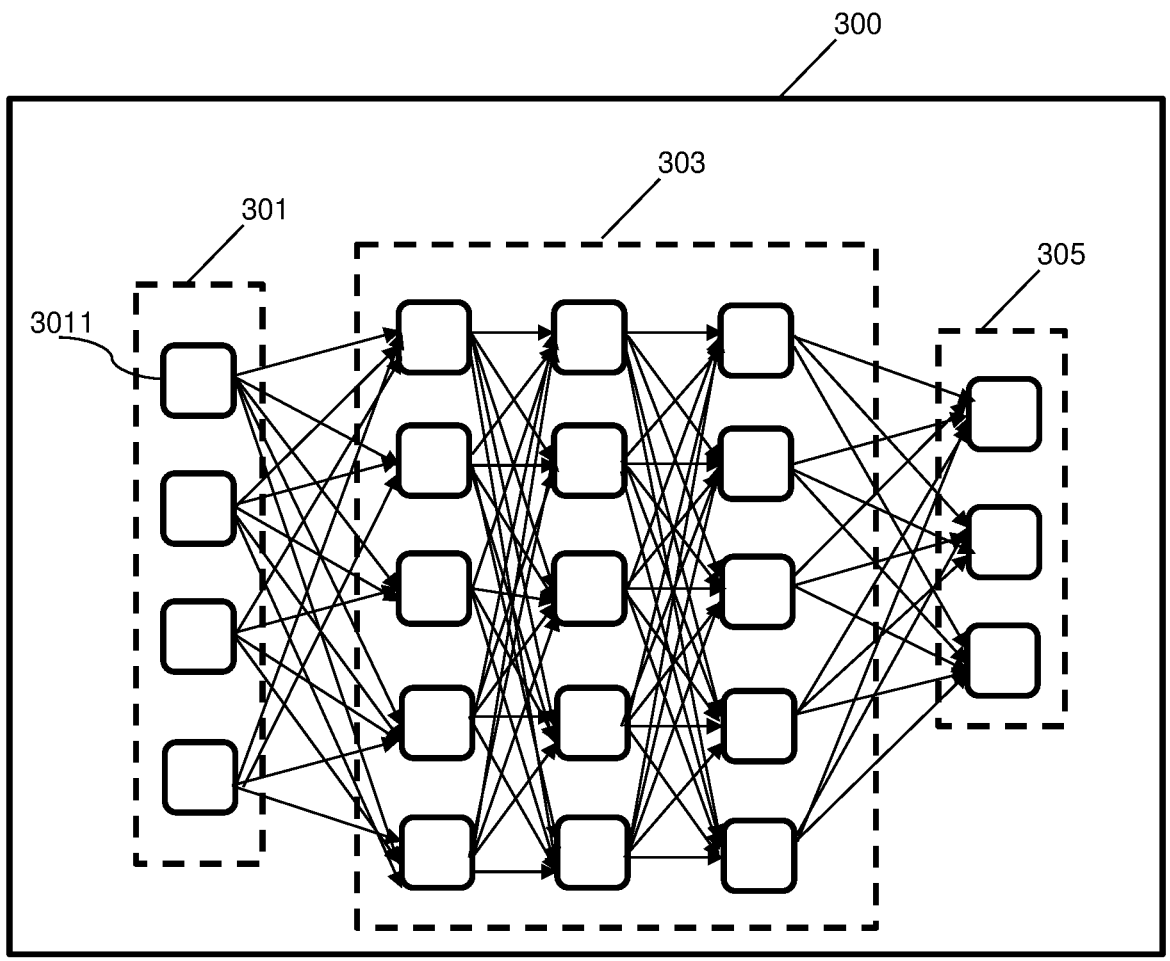
FIG. 3 illustrates a schematic diagram of a machine learning algorithm, according to some embodiments of the invention using deep neural networks.

Referring to FIG. 3, a multilayer deep neural network $D(K, \theta_{k=1,\ldots,K}, \tau)$ 300 made up of an input layer 301, at least one hidden layer 303, and an output layer 305 (K≥2), is illustrated. Each layer among the input layer 301, the one or more hidden layers 303, and the output layer 305 comprises a plurality of artificial neurons or computation nodes 3011.

The multilayer deep neural network 300 is fully connected. Accordingly, each computation node in one layer connects with a certain weight to every computation node in the following layer, i.e. combines input from the connected nodes from a previous layer with a set of weights that either amplify or dampen the input values. Each layer's output is simultaneously the subsequent layer's input, starting from the input layer 301 that is configured to receive input data.

Except of the input computation nodes, i.e. the computation nodes 3011 in the input layer, each computation node 4011 comprised in the one or more hidden layers may implement a non-linear activation function τ that maps the weighted inputs of the computation node to the output of the computation node.

According to the multilayer structure, the deep neural network defines a mapping $f(x_0^{(i)}; \theta): \mathbb{R}^{N^{(0)}} \mapsto \mathbb{R}^{N^{(K)}}$ that maps, at each iteration i=1, ..., $N_{iter}$, the input vector $x_0^{(i)} \in \mathbb{R}^{N^{(0)}}$ to an output vector denoted $x_K^{(i)} \in \mathbb{R}^{N^{(K)}}$ through K iterative machine learning processing steps, the $k^{th}$ layer among the K layers of the deep neural network carrying a mapping denoted by $f_k(x_{k-1}^{(i)}; \theta_k): \mathbb{R}^{N^{(k-1)}} \mapsto \mathbb{R}^{N^{(k)}}$ that maps the input vector $x_{k-1}^{(i)} \in \mathbb{R}^{N^{(k-1)}}$ received as input by the $k^{th}$ layer, to the output vector $x_k^{(i)} \in \mathbb{R}^{N^{(k)}}$. The mapping at the $k^{th}$ layer depends on the input vector $x_{k-1}^{(i)}$, which corresponds to the output vector of the previous layer, and the set of parameters $\theta_k = \{W^{(k)} \in \mathbb{R}^{N^{(k)} \times N^{(k-1)}}; b^{(k)} \in \mathbb{R}^{N^{(k)}}\}$ associated with the $k^{th}$ layer. The mapping $f_k(x_{k-1}^{(i)}; \theta_k)$ associated with the $k^{th}$ layer (except the input layer) can be expressed as:

$$f_k(x_{k-1}^{(i)}; \theta_k) = \sigma(W^{(k)} x_{k-1}^{(i)} + b^{(k)}) \tag{14}$$

The input-weight products performed at the computation nodes of the $k^{th}$ layer are represented by the product function $W^{(k)} x_{k-1}^{(i)}$ between the weight matrix $W^{(k)}$ and the input vector $x_{k-1}^{(i)}$ processed as input by the $k^{th}$ layer, these input-weight products are then summed and the sum is passed through the activation function σ.

According to some embodiments, the activation function may be implemented in at least one computation node 3011 among the plurality of computation nodes of the one or more hidden layers 303 and the output layer 305.

According to some embodiments, the activation function may be implemented at each node of the hidden layers.

According to some embodiments, the activation function may be chosen in a group comprising a linear activation function, a sigmoid function, the Tanh, the softmax function, a rectified linear unit (ReLU) function, and the CUBE function.

The linear activation function is the identity function in which the signal does not change.

The sigmoid function converts independent variables of almost infinite range into simple probabilities between '0' and '1'. It is a non-linear function that takes a value as input and outputs another value between '0' and '1'.

The tanh function represents the relationship between the hyperbolic sine and the hyperbolic cosine tanh(x)=sinh(x)/cosh(x).

The softmax activation generalizes the logistic regression and returns the probability distribution over mutually exclusive output classes. The softmax activation function may be implemented in the output layer of the deep neural network.

The ReLU activation function activates a neuron if the input of the neuron is above a given threshold. In particular, the given threshold may be equal to zero ('0'), in which case the ReLU activation function outputs a zero value if the input variable is a negative value and outputs the input variable according to the identity function if the input variable is a positive value. Mathematically, the ReLU function may be expressed as σ(x)=max(0, x).

According to some embodiments, the radius determination unit 201 may be configured to previously determine and update the model parameters of the multilayer deep neural network during a training phase from training data. The radius determination unit 201 may be configured to perform the training phase offline before implementing the $N_{iter}$ iteration performed to determine the search sphere radius $r_s$. Once, determined, the model parameters are then used at each iteration i=1, ..., $N_{iter}$ performed to update the current radius until a stopping condition is reached. The training phase (also referred to as 'a learning phase') is a global optimization problem performed to adjust the model parameters $\theta_{k=1, ..., K}$ in a way that enables minimizing a prediction error that quantifies how close the multilayer deep neural network is to the ideal model parameters that provide the best prediction. The model parameters may be initially set to initial parameters that may be, for example, randomly generated. The initial parameters are then updated during the training phase and adjusted in a way that enables the neural network to converge to the best predictions.

According to some embodiments, the multilayer deep neural network may be trained using back-propagation supervised learning techniques and uses training data to predict unobserved data.

The back-propagation technique is an iterative process of forward and backward propagations of information by the different layers of the multilayer deep neural network.

During the forward propagation phase, the neural network receives training data that comprises training input values and expected values (also referred to as 'labels') associated with the training input values, the expected values corresponding to the expected output of the neural network when the training input values are used as input. The expected values are known by the radius determination unit 201 in application of supervised machine learning techniques. The neural network passes the training data across the entire multilayer neural network to determine estimated values (also referred to as 'intermediate values') that correspond to the predictions obtained for the training input values. The training data are passed in a way that all the computation nodes comprised in the different layers of the multilayer deep neural network apply their transformations or computations to the input values they receive from the computation nodes of the previous layers and send their output values to the computation nodes of the following layer. When data has crossed all the layers and all the computation nodes have made their computations, the output layer delivers the estimated values corresponding to the training data.

The last step of the forward propagation phase consists in comparing the expected values associated with the training data with the estimated values obtained when the training data was passed through the neural network as input. The comparison enables measuring how good/bad the estimated values were in relation to the expected values and to update the model parameters with the purpose of approaching the estimated values to the expected values such that the prediction error (also referred to as 'estimation error' or 'cost') is near to zero. The prediction error may be estimated using a loss function based on a gradient procedure that updates the model parameters in the direction of the gradient of an objective function.

The forward propagation phase is followed with a backward propagation phase during which the model parameters, for instance the weights of the interconnections of the computation nodes 3011, are gradually adjusted in reverse order by applying an optimization algorithm until good predictions are obtained and the loss function is minimized.

First, the computed prediction error is propagated backward starting from the output layer to all the computation nodes 3011 of the one or more hidden layers 303 that contribute directly to the computation of the estimated values. Each computation node receives a fraction of the total prediction error based on its relative contribution to the output of the deep neural network. The process is repeated, layer by layer, until all the computation nodes in the deep neural network have received a prediction error that corresponds to their relative contribution to the total prediction error. Once the prediction error is spread backward, the layer parameters, for instance the first layer parameters (i.e. the weights) and the second layer parameters (i.e. the biases), may be updated by applying an optimization algorithm in accordance to the minimization of the loss function.

According to some embodiments, the radius determination unit 201 may be configured to update the model parameters during the training phase according to a 'batch gradient descent approach' by computing the loss function and updating the model parameters for the entire training data.

According to some embodiments, the radius determination unit 201 may be configured to update the model parameters during the training phase according to online learning by adjusting the model parameters for each sample of the training data. Using online learning, the loss function is evaluated for each sample of the training data. Online learning is also referred to as 'online training' and 'stochastic gradient descent'.

According to other embodiments, the radius determination unit 201 may be configured to update the model parameters during the training phase from training data according to mini-batch learning (also referred to as 'mini-batch gradient descent') using mini-batches of data, a mini-batch of data of size $s_b$ is a subset of $s_b$ training samples. Accordingly, the radius determination unit 201 may be configured to partition the training data into two or more batches of data of size $s_b$, each batch comprising $s_b$ samples of input data. The input data is then passed through the network in batches. The loss function is evaluated for each mini-batch of data passed through the neural network and the model parameters are updated for each mini-batch of data. The forward propagation and backward propagation phases are accordingly performed for each mini-batch of data until the last batch.

According to some embodiments, the radius determination unit 201 may be configured to pass all the training data through the deep neural network 300 in the training process a plurality of times, referred to as epochs. The number of epochs may be increased until an accuracy metric evaluating the accuracy of the training data starts to decrease or continues to increase (for example when a potential overfitting is detected).

The received training data denoted $x^*=(s^*, r^*_s, R^*)$ may comprise $Nb_s$ training samples denoted $S=\{x^{*,1}, \ldots, x^{*,Nb_s}\}$ that comprise independent training samples dependent on the components of a training vector of information symbols $s^*$, the components of a training upper triangular matrix $R^*$, and a training sphere radius value $r^*_s$.

Based on supervised learning, the training samples may be labeled, i.e. associated with known expected output values (also referred to as 'targets' or 'labels') that correspond to the output of the deep neural network when the training samples are used as inputs of the deep neural network. More specifically, each sample $x^{*,m}$ for $m=1, \ldots, Nb_s$ may be associated with an expected value $N^*_{exp}{}^{,m}$ of number of lattice points that fall inside the spherical region of radius $r^*_s$.

According to some embodiments in which mini-batch learning is used, the radius determination unit 201 may be configured to determine (update or adjust) the model parameters during a training phase in mini-batches extracted from the received training data. In such embodiments, the radius determination unit 201 may be configured to partition the received training data into a plurality NB of sets of training data denoted $x^{(*,1)}, x^{(*,2)}, \ldots, x^{(*,NB)}$, a set of training data being a mini-batch of size $s_b$ comprising a set of $s_b$ training examples from the training data, i.e. each mini-batch $x^{(*,l)}$ comprises $s_b$ samples $x^{*,m}$ with m varying between 1 and $Nb_s$. A mini-batch $x^{(*,l)}$ is also designated by $S_l$ with training samples extracted from the $Nb_s$ training samples, that is $S_l \subset S$.

Each mini-batch $x^{(*,l)}$ for $l=1, \ldots, NB$ may be associated with a target value that corresponds to an expected number $N_{exp}{}^{(*,l)}$ of lattice points that is expected to be obtained by the deep neural network when the mini-batch of data $x^{(*,l)}$ is used as input of the deep neural network. The sets of training data and the target values may be grouped into vector pairs such that each vector pair denoted $(x^{(*,l)}, N_{exp}{}^{(*,l)})$ corresponds to the training examples and target values of the $l^{th}$ mini-batch.

Given the training data and the expected output values, the radius determination unit 201 may be configured to perform the forward propagation and backward propagation phases of the training process.

Based on mini-batch training, the training phase may comprise two or more processing iterations. At each processing iteration, the radius determination unit 201 may be configured to:

process the deep neural network using a mini-batch $x^{(*,l)}$ among the plurality of training sets as input, which provides an intermediate number of lattice points denoted $N_{est}{}^{(,l)}$ associated with the mini-batch $x^{(*,l)}$. The intermediate number of lattice points $N_{est}{}^{(,l)}$ is predicted at the output layer of the multilayer deep neural network;

compute a loss function denoted $L(N_{exp}{}^{(*,l)}, N_{est}{}^{(*,l)})$ for the processed mini-batch $x^{(*,l)}$ from the expected number $N_{exp}{}^{(*,l)}$ of lattice points associated with the mini-batch $x^{(*,l)}$ and the intermediate number of lattice points $N_{est}{}^{(*,l)}$ determined by processing the mini-batch of data $x^{(*,l)}$;

determine updated model parameters after processing the mini-batch $x^{(*,l)}$ according to the minimization of the loss function $L(N_{exp}{}^{(*,l)}, N_{est}{}^{(*,l)})$ by applying an optimization algorithm. More specifically, the radius determination unit 201 may be configured to determine updated first layer parameters $W^{(k)} \in \mathbb{R}^{N^{(k)} \times N^{(k-1)}}$ and updated second layer parameters $b^{(k)} \in \mathbb{R}^{N^{(k)}}$ associated with each of the K layers of the multilayer deep neural network $D(K, \theta_{k=1, \ldots, K}, \sigma)$ except the input layer, the first layer parameters and the second layer parameters corresponding respectively to the weights associated with the connections between the neurons of the deep neural network and the bias values.

For the first processing iteration, the radius determination unit 201 may be configured to determine initial model parameters that will be used during the forward propagation phase of the first processing iteration of the training process. More specifically, the radius determination unit 201 may be configured to determine initial first layer parameters $W^{(k,init)} \in \mathbb{R}^{N^{(k)} \times N^{(k-1)}}$ and initial second layer parameters $b^{(k,init)} \in \mathbb{R}^{N^{(k)}}$ associated with each of the K layers of the multilayer deep neural network $D(K, \theta_{k=1, \ldots, K}, \sigma)$ except the input layer.

According to some embodiments, the radius determination unit 201 may be configured to determine initial first layer parameters and initial second layer parameters associated with the different layers (hidden layers and output layer) of the deep neural network randomly from a random set of values, for example following a standard normal distribution.

According to some embodiments, the optimization algorithm used to adjust the model parameters and determine updated model parameters may be chosen in a group comprising the Adadelta optimization algorithm, the Adagrad optimization algorithm, the adaptive moment estimation algorithm (ADAM) that computes adaptive learning rates for each model parameter, the Nesterov accelerated gradient (NAG) algorithm, the Nesterov-accelerated adaptive moment estimation (Nadam) algorithm, the RMSprop algorithm, stochastic gradient optimization algorithms, and adaptive learning rate optimization algorithms.

According to some embodiments, the loss function considered to evaluate the prediction error or loss may be chosen in a group comprising a mean square error function (MSE) that is used for linear regression, and the exponential log likelihood (EXPLL) function used for Poisson regression.

According to some embodiments in which the mean square error function is used, the loss function computed for the $l^{th}$ mini-batch of data may be expressed as:

$$L(N_{exp}^{(*,l)}, N_{est}^{(*,l)}) = \frac{1}{S_b} \sum_{m \in S_l} (N_{exp}^{*,m} - N_{est}^{*,m})^2 \quad (15)$$

According to some embodiments, the radius determination unit 201 may be configured to previously determine the expected numbers of lattice points $N_{exp}^{(*,l)}$ associated with each mini-batch $S_l$ for l=1, . . . , NB from a sphere radius r and the predefined precoding matrix R by applying a list sphere decoding (LSD) algorithm or a list spherical-bound stack decoding algorithm. The list sphere decoding algorithm and the list spherical-bound stack decoding algorithm are sphere-based decoding algorithms used to solve the closest vector problem. The LSD outputs a list of the codewords that lie inside a given bounded region of a given radius. More details on the LSD implementations are disclosed in "M. El-Khamy et al., Reduced Complexity List Sphere Decoding for MIMO Systems, Digital Signal Processing, Vol. 25, Pages 84-92, 2014".

Figure 4:
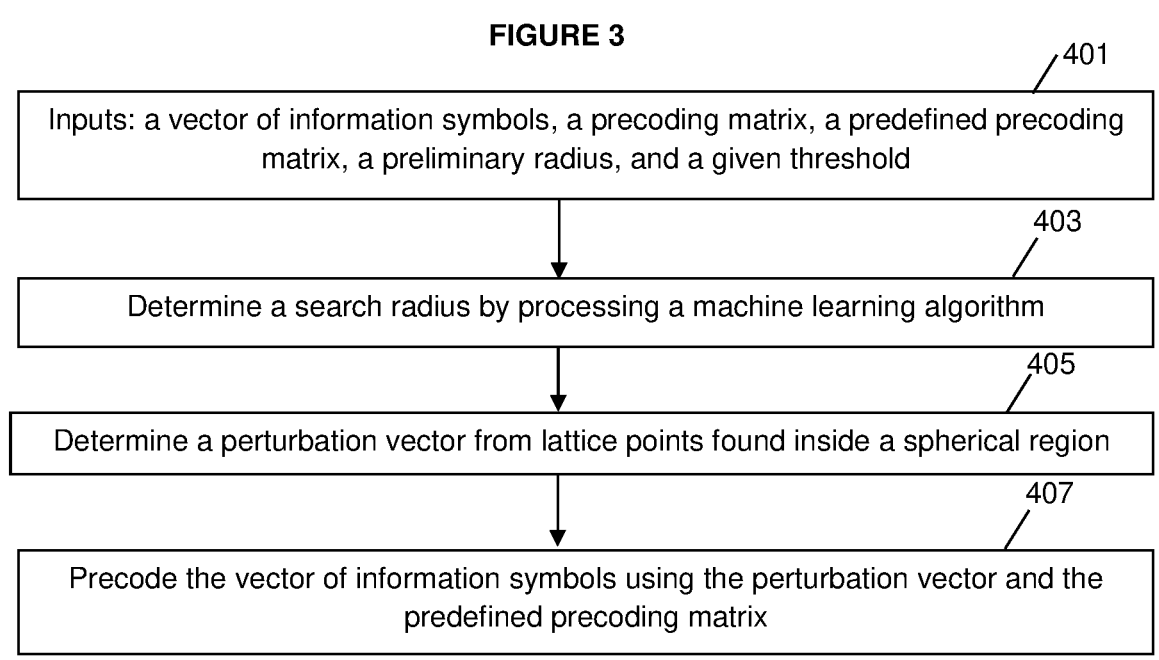
FIG. 4 is a flowchart illustrating a precoding method, according to some embodiments of the invention.

Referring to FIG. 4, there is also provided a precoding method for precoding a vector of information symbols s∈ $\mathbb{R}^n$ that comprises real and imaginary parts of a modulated complex-value information symbols vector $s_c$. The method relies on using vector perturbation recoding to precode the vector of information symbols s into a precoded vector of information symbols $s_p$.

At step 401, inputs comprising a vector of information symbols s, a predefined precoding matrix R, a preliminary radius $r_0$, and a given threshold $N_{th}$ may be received.

At step 403, a search sphere radius $r_s$ may be determined, the determination of the search sphere radius comprising applying a machine learning algorithm to input data that depend on the vector of information symbols s, an integer scaling factor τ, and the predefined precoding matrix R.

At step 405, a perturbation vector t=$(t_1, t_2, \ldots, t_n)^t$ may be determined from lattice points found inside the spherical region ⊠ $_{r_s}$ of radius $r_s$ centered at the origin by applying a sphere search-based sequential algorithm that solves the optimization problem given by $$t = \underset{v \in \mathbb{Z}^n}{\arg\min} \|R(s + \tau t')\|^2 \leq r_s^2.$$

According to some embodiments, the sphere search-based sequential algorithm may be chosen in a group comprising the sphere decoder and the SB-Stack decoder.

At step 407, the vector of information symbols may be precoded to the precoded vector of information symbols $s_p$ using the perturbation vector determined at step 405, the precoding matrix P and the integer scaling factor τ such that $s_p$=P(s+τt).

Figure 5:
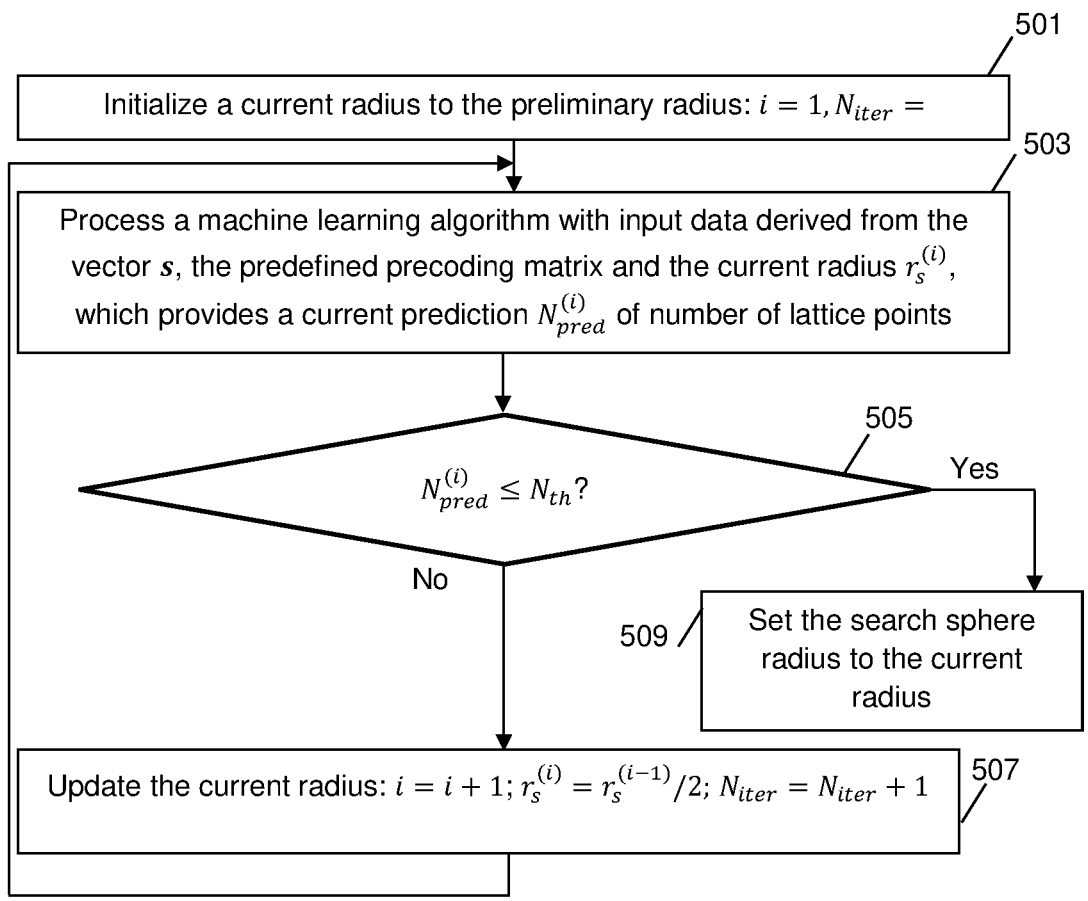
FIG. 5 is a flowchart illustrating a method for search radius determination, according to some embodiments of the invention.

FIG. 5 is a flowchart illustrating a method of determining the search sphere radius $r_s$ performed at step 403, according to some embodiments in which an iterative process is performed during a number of iterations $N_{iter}$ of a radius update function to update a current radius.

At step 501, the index of the iterations of the iterative process may be initialized to i=1 and a current radius may be initially set to the preliminary radius $r_s^{(1)}=r_0$.

Steps 503 to 507 may be repeated during a number of iterations $N_{iter}$ of a radius update function until a termination condition is satisfied.

At step 503, a machine learning algorithm may be processed using input data derived from the vector of information symbols s, the predefined precoding matrix R and the current radius $r_s^{(i)}$, which provides a current predicted number of lattice points $N_{pred}^{(i)}$ associated with the current radius $r_s^{(i)}$. The current predicted number of lattice points $N_{pred}^{(i)}$ corresponds to a predicted number of lattice points that fall inside a spherical region centered at the origin and having of a sphere radius the current radius $r_s^{(i)}$. The machine learning algorithm takes as input the input vector $x_0^{(i)}$=(s, $r_s^{(i)}$, R) that comprises n components of the vector of information symbols s, the current radius $r_s^{(i)}$, and $n^2$ components in the upper triangular R.

At step 505, the current predicted number of lattice points $N_{pred}^{(i)}$ may be compared to the given threshold $N_{th}$.

If it is determined at step 505 that the current prediction $N_{pred}^{(i)}$ of number of lattice points is smaller than or equal to the given threshold $N_{th}$, the search sphere radius $r_s$ may be set at step 509 to the last updated current radius $r_s^{(i)}=r_s^{(N_{iter})}$ that is associated with the current predicted number $N_{pred}^{(N_{iter})}$ of lattice points that satisfies the termination condition of step 505.

If it is determined at step 505 that the current predicted number $N_{pred}^{(i)}$ of lattice points is strictly higher than the given threshold, i.e. if $N_{pred}^{(i)}>N_{th}$, the current radius may be updated at step 507. Accordingly, the index of the iteration may be incremented such that i=i+1, the current radius may be updated by applying a linear function $f$ to the current radius and the number of performed iterations of the radius update function may be incremented by one such that $N_{iter}=N_{iter}+1$.

According to some embodiments, the linear function may have a slope parameter equal to ½ and an intercept parameter equal to zero, which corresponds to updating the current radius dividing the current radius by two such that $r_s^{(i)}=r_s^{(i-1)}/2$.

According to some embodiments, the machine learning algorithm may be a supervised machine learning algorithm chosen in a group, comprising without limitation, Support Vector Machines, linear regression, logistic regression, naive Bayes, linear discriminant analysis, decision trees, k-nearest neighbor algorithm, neural networks, and similarity learning.

In preferred embodiments, the supervised machine learning algorithm may be a multilayer perceptron that is a multilayer feed-forward artificial neural network $D(K, \theta_{k=1,\ldots,K}, \sigma)$ made up of an input layer, one or more hidden layers and an output layer (K≥2) and associated with model parameters $\theta_{k=1,\ldots,K}$ and an activation function $\sigma$, the model parameters $\theta_{k=1,\ldots,K}$ comprising sets of layer parameters $\theta_k\{W^{(k)} \in \mathbb{R}^{N^{(k)} \times N^{(k-1)}}; b^{(k)} \in \mathbb{R}^{N^{(k)}}\}$, each set of layer parameters being associated with a layer among the hidden layers and the output layer parameters and comprising a first layer parameter $W^{(k)}$, and a second layer parameter $b^{(k)}$.

According to some embodiments, the activation function may be chosen in a group comprising a linear activation function, a sigmoid function, the Tanh, the softmax function, a rectified linear unit function, and the CUBE function.

According to some embodiments in which the machine learning algorithm is a multilayer deep neural network, step 503 may comprise a sub-step that is performed to determine updated model parameters according to a back-propagation supervised training or learning process that uses training data to train the multilayer deep neural network before processing the neural network for the determination of current radius during the decoding process.

According to some embodiments, the model parameters may be updated during the training process according to a 'batch gradient descent approach' by computing a loss function and updating the model parameters for the entire training data.

According to some embodiments, the model parameters may be updated during the training process according to online learning by adjusting the model parameters for each sample of the training data and computing a loss for each sample of the training data.

According to other embodiments, the model parameters may be updated during the training process from training data according to mini-batch learning using mini-batches of data, a mini-batch of data of size $s_b$ is a subset of $s_b$ training samples. Accordingly, the training data may be partitioned into two or more mini-batches of data of size $s_b$, each batch comprising $s_b$ samples of the input data. The input data is then passed through the network in mini-batches. A loss function is evaluated for each mini-batch of data and the model parameters are updated for each mini-batch of data.

Figure 6:
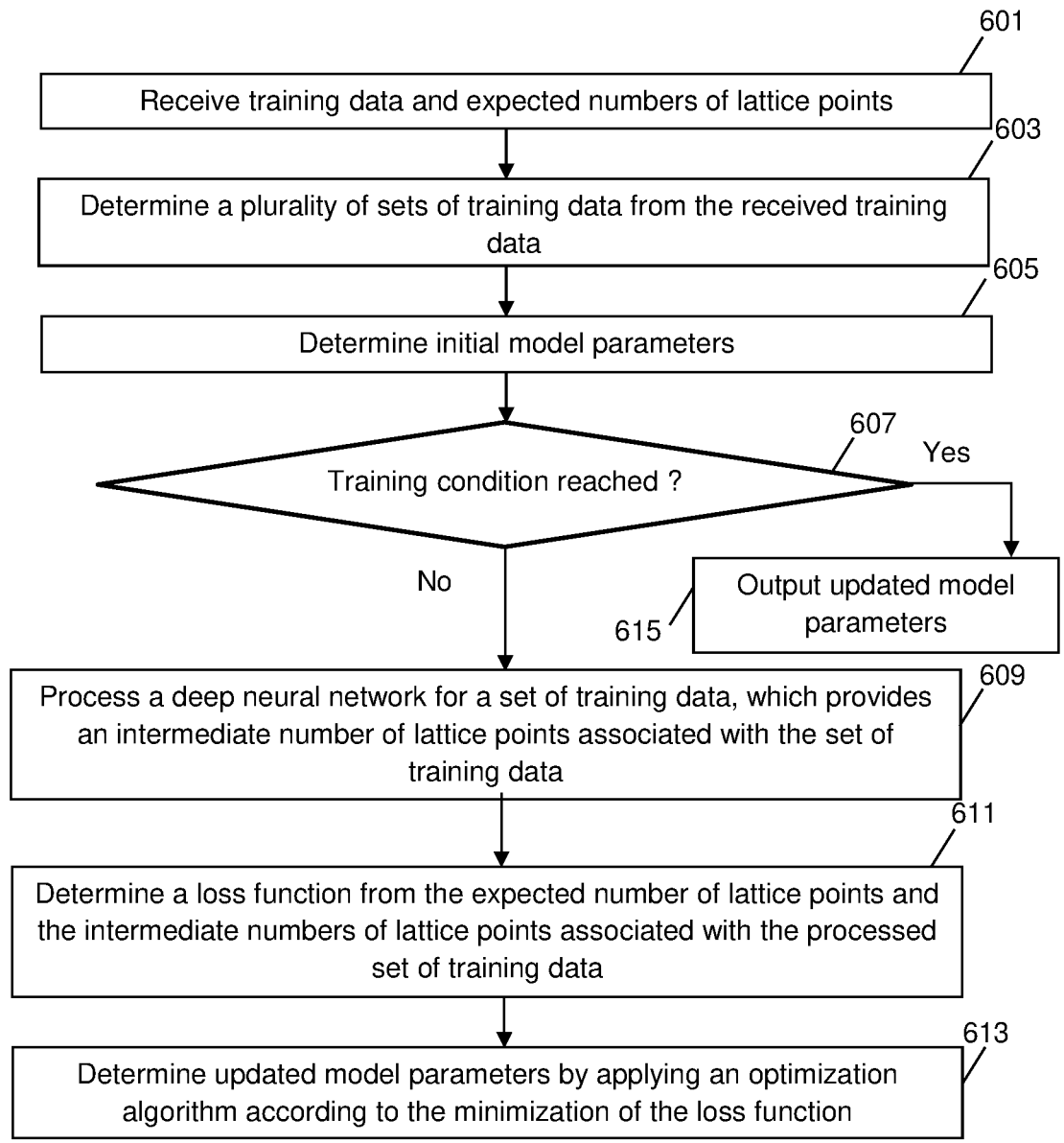
FIG. 6 is a flowchart depicting a method for training a deep neural network, according to some embodiments of the invention.

FIG. 6 is a flowchart depicting a method for training the multilayer deep neural network $D(K, \theta_{k=1,\ldots,K}, \sigma)$ in order to determine the model parameters $\theta_{k=1,\ldots,K}$ that provide the best prediction in terms of the minimization of the prediction error according to some embodiments using mini-batch learning.

At step 601, training data $x^*=(s^*, r^*_s, R^*)$ comprising $Nb_s$ training samples $S=\{x^{*,1}, \ldots, x^{*,Nb_s}\}$ and expected numbers of lattice points $N^*_{exp}{}^{,1}, \ldots, N^*_{exp}{}^{,Nb_s}$ may be received, each sample $x^{*,m}$ for $m=1, \ldots, Nb_s$ being associated with an expected value $N^*_{exp}{}^{,m}$ of number of lattice points that fall inside the spherical region of radius $r^*_s$.

At step 603, training data may be partitioned into a plurality NB of sets of training data $x^{(*,1)}, x^{(*,2)}, \ldots, x^{(*,NB)}$, Each mini-batch $x^{(*,l)}$ for $l=1, \ldots,$ NB may be associated with a target value that corresponds to an expected number $N_{exp}{}^{(*,l)}$ of lattice points that is expected to be obtained by the deep neural network when the mini-batch of data $x^{(*,l)}$ is used as input of the deep neural network.

The training process may comprise two or more processing iterations that are repeated until a training condition is reached. The training condition may be related to the number of epochs which refers to the number of times the training data have passed through the deep neural network during the training phase and/or to goodness of the updated model parameters with respect to the minimization of the prediction errors resulting from the updated model parameters.

At step 605, a first processing iteration may be performed during which initial model parameters may be determined to be used to process the first mini-batch of data. More specifically, initial first layer parameters $W^{(k,init)} \in \mathbb{R}^{N^{(k)} \times N^{(k-1)}}$ and initial second layer parameters $b^{(k,init)} \in \mathbb{R}^{N^{(k)}}$ associated with each of the K layers of the multilayer deep neural network $D(K, \theta_{k=1,\ldots,K}, \sigma)$ (except the input layer) may be determined at step 605.

According to some embodiments, the initial first layer parameters and the initial second layer parameters associated with the hidden layers and the output layer of the deep neural network may be determined randomly from a random set of values, for example following a standard normal distribution.

Steps 607 to 613 may be repeated for processing the mini-batches of data until the stopping condition is reached. A processing iteration of the training process consists of the steps 609 to 613 and relates to the processing of a mini-batch $x^{(*,l)}$ among the plurality of training sets $x^{(*,l)}$ for $l=1, \ldots,$ NB.

At step 609, the multilayer deep neural network may be processed using a mini-batch $x^{(*,l)}$ among the plurality of training sets as input, which provides an intermediate number of lattice points denoted $N_{est}{}^{(*,l)}$ associated with the mini-batch $x^{(*,l)}$. The intermediate number of lattice points $N_{est}{}^{(*,l)}$ is predicted at the output layer of the multilayer deep neural network.

At step 611, a loss function $L(N_{exp}{}^{(*,l)}, N_{est}{}^{(*,l)})$ may be computed for the processed mini-batch $x^{(*,l)}$ from the known expected number $N_{exp}{}^{(*,l)}$ of lattice points associated with the mini-batch $x^{(*,l)}$ and the intermediate number of lattice points $N_{est}{}^{(*,l)}$ determined by processing the mini-batch of data $x^{(*,l)}$ at step 609.

At step 613, updated model parameters may be determined after processing the mini-batch $x^{(*,l)}$ according to the minimization of the loss function $L(N_{exp}{}^{(*,l)}, N_{est}{}^{(*,l)})$ by applying an optimization algorithm. More specifically, the first layer parameters $W^{(k)} \in \mathbb{R}^{N^{(k)} \times N^{(k-1)}}$ and the second layer parameters $b^{(k)} \in \mathbb{R}^{N^{(k)}}$ associated with each of the K hidden and output layers of the multilayer deep neural network $D(K, \theta_{k=1,\ldots,K}, \sigma)$ may be updated at step 613, the first layer parameters and the second layer parameters corresponding respectively to the weights associated with the connections between the neurons of the deep neural network and the bias values.

According to some embodiments, the optimization algorithm may be chosen in a group comprising the Adadelta optimization algorithm, the Adagrad optimization algorithm, the adaptive moment estimation algorithm, the Nesterov accelerated gradient algorithm, the Nesterov-accelerated adaptive moment estimation algorithm, the RMSprop algorithm, stochastic gradient optimization algorithms, and adaptive learning rate optimization algorithms.

According to some embodiments, the loss function may be chosen in a group comprising a mean square error function and the exponential log likelihood function.

According to some embodiments, step 601 may comprise determining expected number of lattice points associated with each mini-batch $S_l$ for $l=1, \ldots,$ NB from a sphere radius r and the channel matrix R by applying a list sphere decoding algorithm.

There is also provided a computer program product for precoding a vector of information symbols $s=(s_1, s_2, \ldots, s_n)^t$. The computer program product comprises a non-transitory computer readable storage medium that, when executed by a processor, cause the processor to:

determine a search sphere radius $r_s$, the determination of the search sphere radius comprising applying a machine learning algorithm to input data that depend on the vector of information symbols s, a scaling factor τ, and the predefined precoding matrix R;

determine a perturbation vector $t=(t_1, t_2, \ldots, t_n)^t$ from lattice points found inside the spherical region $\mathcal{S}_{r_s}$ of radius $r_s$ centered at the origin by applying a sphere search-based sequential algorithm that solves the optimization problem given by $$t = \operatorname*{argmin}_{t' \in \mathbb{Z}^n} \|R(s + \tau t')\|^2 \leq r_s^2;$$

precode the vector of information symbols to the precoded vector of information symbols $s_p$ using the perturbation vector, the integer scaling factor τ, and the precoding matrix P such that $s_p = P(s+\tau t)$.

Performance of the precoding techniques provided in the various embodiments of the invention has been evaluated in terms of bit error rate, average processing time, and average number of radius updates function of the preliminary radius in the smart sphere Encoder. 'SE' refers to the Sphere Encoder implementation in which the search sphere radius is determined using deep neural networks according to the embodiments of the invention and 'SSE' refers to the Smart Sphere Encoder implementation in which the search sphere radius is determined according to function relating the given threshold to the preliminary radius without processing a machine learning algorithm. A distributed 8×8 MIMO system using 16-QAM modulations is considered. Multilayer deep neural networks made up of one input layer, one hidden layer, and one output layer are used.

Figure 7:
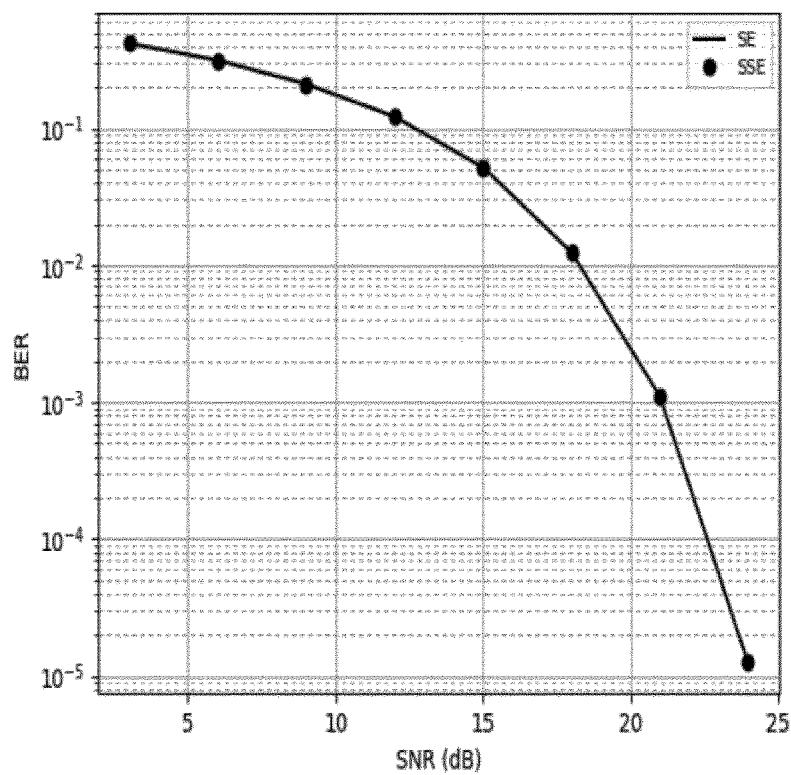
FIG. 7 illustrates diagrams representing the bit error rate performance as a function of the signal-to-noise ratio obtained using the sphere encoder and a smart sphere encoder, according to some embodiments of the invention.

FIG. 7 shows diagrams evaluating the bit error rate (BER) performance as function of the signal-to-noise ratio for the SE and the SSE. Numerical results show that both the proposed SE and the SSE implementations achieve optimal decoding performance.

Figure 8:
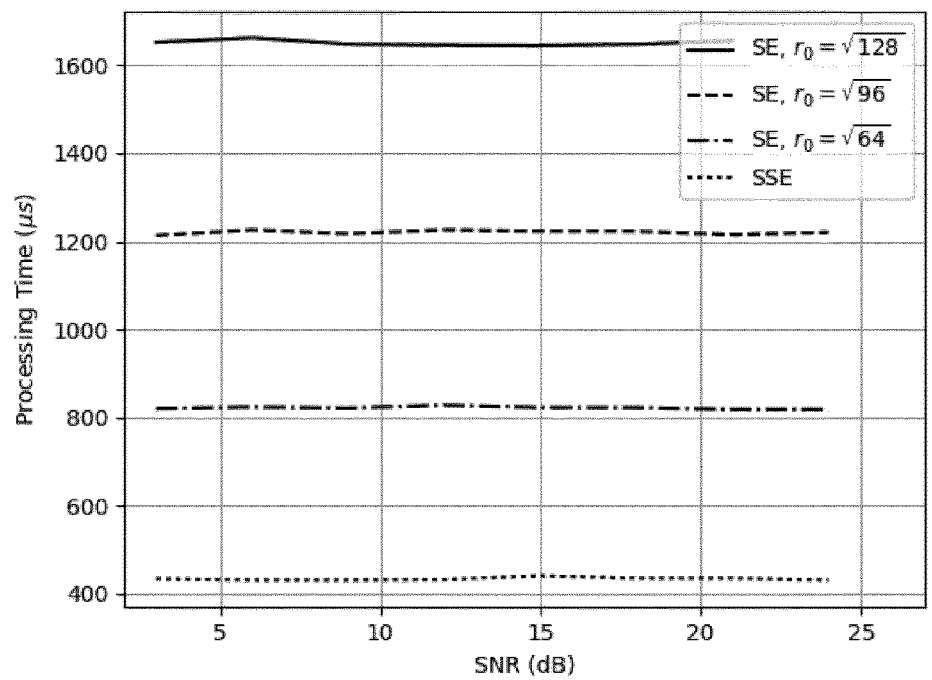
FIG. 8 illustrates diagrams representing the processing time in micro seconds as a function of the signal-to-noise ratio obtained using the sphere encoder and the smart sphere encoder according to some embodiments of the invention.

FIG. 8 shows diagrams evaluating the average processing time function of the signal to noise ratio obtained for the SE considering different preliminary radiuses $r_0$ and SSE implementations. Numerical results show that the SSE greatly reduces the precoding processing time compared to the classical SE implementation.

The devices, methods, and computer program products described herein may be implemented by various means. For example, these techniques may be implemented in hardware, software, or a combination thereof. For a hardware implementation, the processing elements of the precoder 200 can be implemented for example according to a hardware-only configuration (for example in one or more FPGA, ASIC, or VLSI integrated circuits with the corresponding memory) or according to a configuration using both VLSI and Digital Signal Processor (DSP).

Furthermore, the method described herein can be implemented by computer program instructions supplied to the processor of any type of computer to produce a machine with a processor that executes the instructions to implement the functions/acts specified herein. These computer program instructions may also be stored in a computer-readable medium that can direct a computer to function in a particular manner. To that end, the computer program instructions may be loaded onto a computer to cause the performance of a series of operational steps and thereby produce a computer implemented process such that the executed instructions provide processes for implementing the functions specified herein.

The invention claimed is:

1. A precoder for precoding a vector of information symbols, comprising:

a radius determination unit configured to determine a search sphere radius, said determination of the search sphere radius comprising applying a machine learning algorithm to input data comprising components of said vector of information symbols and depending on a predefined precoding matrix; and a sphere encoding unit configured to determine a perturbation vector from lattice points found inside a spherical region by applying a sphere search-based sequential algorithm, said spherical region having as a radius said search sphere radius, and a precoding unit configured to precode said vector of information symbols using said perturbation vector and a precoding matrix.

2. The precoder of claim 1, wherein the radius determination unit is configured to apply one or more iterations of a radius update function to update a current radius until a termination condition is fulfilled, said current radius being initially set to a preliminary radius, each iteration of the radius update function comprising:

applying said machine learning algorithm to input data derived from said vector of information symbols, from said predefined precoding matrix and from said current radius, which provides a current predicted number of lattice points associated with a current radius;

comparing said current predicted number of lattice points to a given threshold;

updating said current radius if said current predicted number of lattice points is strictly higher than said given threshold, said current radius being updated by applying a linear function to said current radius;

said termination condition being related to the current predicted number of lattice points, the radius determination unit being configured to set the search sphere radius to the current radius, in response to the fulfillment of the termination condition.

3. The precoder of claim 2, wherein said termination condition is satisfied if the current predicted number of lattice points is smaller than or equal to said given threshold.

4. The precoder of claim 2, wherein the linear function has a slope parameter equal to ½ and an intercept parameter equal to zero.

5. The precoder of claim 1, wherein the machine learning algorithm is a supervised machine learning algorithm chosen from a group comprising Support Vector Machines, linear regression, logistic regression, naive Bayes, linear discriminant analysis, decision trees, k-nearest neighbor algorithm, neural networks, and similarity learning.

6. The precoder of claim 5, wherein the supervised machine learning algorithm is a multilayer deep neural network comprising an input layer, one or more hidden layers, and an output layer, each layer comprising a plurality of computation nodes, said multilayer deep neural network being associated with model parameters and an activation function, said activation function being implemented in at least one computation node among the plurality of computation nodes of said one or more hidden layers.

7. The precoder of claim 6, wherein said activation function is chosen from a group comprising a linear activation function, a sigmoid function, a Relu function, a Tanh, a softmax function, and a CUBE function.

8. The precoder of claim 6, wherein the radius determination unit is configured to previously determine said model parameters during a training phase from received training data, said radius determination unit being configured to determine a plurality of sets of training data from said training data and from a set of expected numbers of lattice points, each expected number of lattice points being associated with a set of training data among said plurality of sets of training data, said training phase comprising two or more iterations of the following steps:
- processing said deep neural network using a set of training data among said plurality of training data as input, which provides an intermediate number of lattice points associated with said set of training data;
- determining a loss function from the expected number of lattice points and the intermediate number of lattice points associated with said set of training data, and
- determining updated model parameters by applying an optimization algorithm according to the minimization of said loss function.

9. The precoder of claim 8, wherein said optimization algorithm is chosen from a group comprising the Adadelta optimization algorithm, the Adagrad optimization algorithm, the adaptive moment estimation algorithm, the Nesterov accelerated gradient algorithm, the Nesterov-accelerated adaptive moment estimation algorithm, the RMSprop algorithm, stochastic gradient optimization algorithms, and adaptive learning rate optimization algorithms.

10. The precoder of claim 8, wherein said loss function is chosen from a group comprising a mean square error function and an exponential log likelihood function.

11. The precoder of claim 8, wherein the radius determination unit is configured to previously apply a list sphere decoding algorithm or a list spherical-bound stack decoding algorithm to determine said expected numbers of lattice points from said search sphere radius and from said channel matrix.

12. The precoder of claim 4, wherein the radius determination unit is configured to determine said number of iterations of the radius update function as a function of said preliminary radius, said given threshold, and a determinant of said predefined precoding matrix.

13. The precoder of claim 1, wherein said sphere search-based sequential algorithm is chosen from a group comprising a sphere decoding algorithm and a spherical-bound sphere decoding algorithm.

14. A transmitter implementing a precoder according to claim 1, wherein the transmitter is equipped with multiple antennas and is configured to transmit said vector of information symbols to a plurality of receivers in a multiuser multiple-input multiple-output system.

15. A method for precoding a vector of information symbols, wherein the method comprises:
- determining a search sphere radius, the determination of the search sphere radius comprising applying a machine learning algorithm to input data comprising components of said vector of information symbols and depending on a predefined precoding matrix;
- determining a perturbation vector from lattice points found inside a spherical region by applying a sphere search-based sequential algorithm, said spherical region having as a radius said search sphere radius, and precoding said vector of information symbols using said perturbation vector and a precoding matrix.

* * * * *